Patented June 29, 1937

2,085,492

UNITED STATES PATENT OFFICE 2,085,492

PROCESS OF MAKING UREA RESIN PRODUCTS

Carleton Ellis, Montclair, N. J., assignor, by mesne assignments, to Plaskon Company, Incorporated, a corporation of Delaware No Drawing. Application January 13, 1934, Serial No. 706,559

3 Claims. (Cl. 260—3)

This invention relates to a process of making urea-formaldehyde condensation products and comprises the use of commercial aqueous formaldehyde of normal acid reaction, with or without an added acid or acids, as hereinafter described, and the carrying out of at least some part of the earlier stage or stages of the condensation of urea or other carbamide compound and formaldehyde preferably at ordinary or subnormal temperatures in the presence of volatile organic solvent bodies especially those miscible with water.

Commercial formaldehyde solution usually contains about 37 per cent by weight of formaldehyde, 15 per cent methyl alcohol (methanol), from 0.02 to 0.03 per cent formic acid and the remainder water. The effect of the small amount of formic acid normally present in the commercial solution is that when urea is mixed with the material there is, after the initial cooling induced by the negative heat of solution of urea, a fairly rapid rise in temperature and formation in a relatively short time of a voluminous white precipitate which is insoluble in hot water and which is of little practical value as an ingredient of molding compositions or lacquers. The formation of insoluble and infusible material in the earlier stage or stages of condensation is therefore to be avoided. Heretofore this avoidance has usually been by way of neutralization of the acid by means of sodium hydroxide or other base, or by addition to the reaction mixture of buffers which reduce the acidity and maintain it at a predetermined low point throughout the reaction period. By such procedures urea and aqueous formaldehyde may be heated until the earlier stage or stages of condensation is complete or has progressed to any desired intermediate point with, for example, the formation of clear syrups or gels. However, this procedure of neutralization introduces foreign substances which may prove objectionable for some purposes.

By carrying out the reaction of urea and ordinary acid-containing methanolic formaldehyde in the presence of additional methanol or other volatile organic diluent miscible with water not only is the thermal effect of the reaction lessened and the intensity of the reaction mitigated, but also a soluble product is obtained which can be used in coating compositions or mixed with fillers and exactly molded under heat and pressure. Preferably the reaction with such a volatile mitigator is carried out at ordinary room temperature or at sub-normal temperatures. When the reaction occurs at a low temperature it is slower than when the mixture is heated but is more easily controlled. After the reaction the diluent of methanol or other mitigating solvent can, of course, be recovered by distillation (for example, vacuum distillation) or by absorption of the vapors during the drying of the impregnated filler, or by spray-drying, or recovery of the solvent in other ways.

The amount of formic acid in standard-grade commercial formaldehyde is such that the aldehyde solution has a normal acid reaction of about pH 2.7. This value of course varies somewhat with the source of the material, condition of storage and other factors, but the acidity usually lies between about pH 2 and pH 3 and is always more acid than pH 4. The preferred process of this invention involves using initial aqueous formaldehyde of acidity more acid than pH 4. Also, since commercial formaldehyde contains a certain amount of methanol, the process embodies the use of methanol-enriched commercial aqueous formaldehyde of normal acid reaction. In place of methanol other organic solvent mitigating bodies miscible with water can be employed such as ethyl and propyl alcohols, acetone, ethers of ethylene glycol (for example, the methyl and ethyl ethers) or glycol acetals. Monohydric alcohols of higher molecular weight such as the butyl and amyl alcohols, benzyl alcohols, and the like, are less suitable for use alone partly on account of their low miscibility with water but can be mixed with a water-soluble organic liquid of the true mitigator type and used in such proportions that the mixture is water-soluble. For example, commercial formaldehyde may be used with a mixture of methyl alcohol and normal amyl alcohol, or acetone and secondary butyl alcohol, the amount of water-soluble ingredient being proportioned so as to render the higher alcohol miscible with the reaction mixture.

Use of water-soluble organic liquid mitigators as described herein represses the spontaneous rise in temperature which is encountered when urea reacts with the usual acid-containing commercial formaldehyde under conditions which form insoluble bodies prematurely. The amount of, e. g., methanol enrichment necessary depends upon the temperature at which the reaction is allowed to take place. At a temperature of about 20° C. an equal volume of methanol and commercial formaldehyde solution is sufficient to prevent any objectionable rise in temperature during reaction. Using these proportions the solution remains clear for about 70 hours, then a precipitate gradually forms which can be dissolved by warming the solution. When ½ volume methanol per volume formaldehyde solution is introduced, a precipitate begins to form in 24 hours at a temperature of 20° C. When ¼ volume methanol is used a very heavy precipitate forms in 24 hours. This latter precipitate is partially soluble in warm water. When the reaction is carried out at low temperatures, say 0° C., the product is more soluble. When greater amounts of methanol than the amount of formaldehyde solution are used the mixtures remain clear for several days.

In my co-pending application Serial 483,135 (page 45), filed September 19, 1930, entitled Urea type of condensation plastic and process of making same, where I have particularly described and claimed the production of condensation products of the urea-formaldehyde type, and their utilization in compositions containing fluxes and fluxing catalysts, as well as the resulting materials themselves. I have pointed out the possibility of conducting the reaction of urea with formaldehyde normally in aqueous solution and in the presence of some added methanol.

Also in a number of co-pending applications, such, for example, as Serial 689,165, filed Jan. 28, 1924, entitled White synthetic resin and process of making same, where I have particularly described and claimed the production of condensation products of the urea-formaldehyde type in the presence of acids and the resulting products, I have disclosed the employment of various volatile solvents such as methyl and ethyl alcohol and acetone in connection with the reaction products of urea and formaldehyde with the aid of an acid catalyst, particularly organic acids of relatively mild acid reaction or degree of dissociation (note page 20 of Serial 689,165; also page 8, Serial 742,719 filed October 9, 1924, now abandoned, which discloses employment of a mixture of acetone resin and partially condensed urea resin in an aqueous alcohol solvent vehicle employed for impregnation purposes, and the like).

The following will serve to illustrate various products made in accordance with the present invention. The proportions given in the examples are parts by weight.

*Example 1.*—40 parts of urea were dissolved in 80 parts of 37% aqueous commercial formaldehyde and 80 parts of methanol were added. The temperature of a 200 g. portion of this solution dropped 4° C. while the urea was dissolving and after 1 hour it reached room temperature (20° C.). Thereafter the temperature arose only one degree and after 3 hours slowly dropped back to room temperature. The solution was allowed to stand at room temperature for 29 hours. No precipitate formed. The clear solution was used to impregnate 45 parts of cellulose flock. After drying overnight the material was placed in an oven at 70° C. and dried for 4 hours. The dry material was then placed in a ball mill and ground until fine. 1 cc. glycerol dichlorohydrin (as an accelerator for curing) and 0.2 g. zinc stearate (as a mold lubricant) were then added for each 100 g. of powder and thoroughly mixed in the ball mill. The powder was molded in a cup mold at 125° C. under a pressure of 3500 lbs. per square inch and was found to cure in 2 minutes, giving a translucent molding.

*Example 2.*—A reaction mixture similar to the above was made up and allowed to stand for 2 days at room temperature and then was heated to 35° C. for 17 hours. At the end of this time a slight precipitate had formed which was soluble when the solution was warmed. This solution was also mixed with fillers, dried and ground in the same manner as the above and molded under the same conditions to give translucent moldings. The flow of the material was somewhat less than the first composition (the first started to flow at about 1100 lbs. and the second at about 2500 lbs. per square inch). By adjusting the time during which reaction occurs in the methanol solution the flow of the material in hot pressing can be varied.

*Example 3.*—In another case a mixture corresponding to the above proportions of urea, methanol and formaldehyde was allowed to stand at room temperature for 24 hours and the clear solution was then poured into a shallow pan. The white granular solid thus obtained by elimination of the solvent was readily soluble in warm water to form a syrupy solution. This syrup probably represents an aqueous solution of methylol compounds obtained from commercial formaldehyde without neutralization of the acid in the formaldehyde by means of basic substances.

During the reaction the methanol-mitigated formic acid in commercial formaldehyde solution appears to exert its potency only in a desirable orienting way. That there is a decrease in acidity as the reaction progresses is shown by the following experiment:

*Example 4.*—Using the proportions of 40 parts urea, 80 parts methanol and 80 parts commercial aqueous formaldehyde, the acidity of the mixture shortly after it was made up was pH 3.4. After 96 hours at room temperature, pH was 4; in 120 hours, 4.3; in 144 hours, 4.3. In 144 hours a very heavy precipitate had formed which was soluble in warm water. On the other hand, when equal volumes of methanol and formaldehyde are mixed and allowed to stand at room temperature in absence of urea there is no change in acidity. After 170 hours at room temperature the pH of the mixture remained at 2.8, the same value that the mixture had originally. Aqueous formaldehyde solutions, as noted, always have a slight acidity (pH 2 to 3), the acid probably being generated from formaldehyde by some intermolecular oxidation or transformation process. When urea is present the formaldehyde is gradually used up so that further formation of acid is arrested in a natural way and the methanol or other organic liquid provides an equilibrium mixture in which the acidity is represented by pH less acid than about 4. The explanation thus offered is in no way to be taken as limiting the process. Whatever the mechanism the result is that an initially soluble intermediate condensation product can be formed from urea and formaldehyde by use of normally acidic aqueous formaldehyde and without neutralization of the acid by use of bases or basic compounds and similar foreign bodies.

The use of a volatile organic liquid mitigator in the reaction thus avoids the presence in the final product of foreign substances which would be expected to detract from the water resistance or insulating properties of the product or be otherwise harmful.

*Example 5.*—In place of the 80 parts methanol in Example 1, 40 parts were used and the reaction was allowed to proceed at room temperature (20° C.). After 2½ hours the temperature of the mixture had risen to a maximum of only 23.5° C. for a 160 g. portion of the mixture and then slowly receded to room temperature. After 24 hours a slight precipitate had formed which could be redissolved by warming the solution.

*Example 6.*—In place of the 80 parts methanol in Example 1, only 20 parts were used. In this case with a total of 140 g. of reactants the temperature of the reaction mixture arose to 24.5° C. in 2½ hours and stayed at this point for more than 2 hours. After 24 hours a thick precipitate had formed which was only partially soluble when the solution was warmed (about ⅔ of the precipitate dissolved).

Eighty parts commercial aqueous formaldehyde and 40 parts urea were mixed with the following organic liquids in the proportions indicated:

*Example 7.*—80 parts ethyl alcohol.
*Example 8.*—80 parts acetone.
*Example 9.*—80 parts isopropyl alcohol.
*Example 10.*—80 parts methyl ether of ethylene glycol.
*Example 11.*—A mixture containing 30 parts methanol and 30 parts secondary butanol.
*Example 12.*—A mixture containing 50 parts acetone and 30 parts normal amyl alcohol.

After the mixtures had stood for 24 hours at room temperature, a slight precipitate had formed in the case of ethyl alcohol, acetone, methyl ether of ethylene glycol and the mixture containing acetone and amyl alcohol. A heavy precipitate had formed in the solutions containing isopropyl alcohol and also in the mixture of methyl alcohol and butyl alcohol. All precipitates were soluble when the solutions were warmed slightly except that according to Example 11, where the precipitate was only partially soluble. Butanol is therefore not as suitable for use in a mitigating agent.

In the above examples the molecular proportions of urea to formaldehyde are 1:1.5. These preferred proportions can be varied so as to use a somewhat greater or lesser amount of either ingredient. Commercially pure urea is used above but material of lower grade is permissible. For example, more crude material known as fertilizer urea which contains small amounts of impurities can be reacted according to the present process.

Part of the urea or formaldehyde can be used initially and the remainder added at a later stage. Also, instead of mixing all the preferred ingredients (methanol, urea and formaldehyde) at one time, any two can be used and the third added at a later period or added gradually over an extended period. For example, to a mixture of urea and commercial formaldehyde, methanol can be added at such a rate as to repress the spontaneous rise in temperature which occurs when methanol is absent. Or, urea can be added to a mixture of aqueous formaldehyde and methanol at such a rate that the temperature of the mixture does not rise appreciably above room temperature. Or, a solution of urea in methanol can be treated with gradual additions of commercial formaldehyde solution. Also, when the reaction mixture is to be used in a molding composition, further additions of methanol or other organic liquid can be made from time to time during the drying of the molding mixture in order to orient the effect of and mitigate the acidity of the composition.

It may be noted that although most commercial solvents have a slight amount of acid present as an impurity, the acidity of the added organic liquid should not be unduly high. If necessary the solvent can be distilled before use. However, a certain amount of acidity in excess of that due to the formaldehyde solution sometimes can be present to advantage. In one case commercial formaldehyde was fortified by addition of 0.1 per cent of acetic acid. 80 parts of this acidified formaldehyde were mixed with 80 parts methanol and 40 parts urea and formed a solution that remained clear during 24 hours. No appreciable rise in temperature occurred during the reaction.

The reaction mixtures normally obtained by the present invention are initially clear solutions. As such they can be used as lacquers for coating various surfaces, or as adhesives, for example in the veneering of wood. Since the solutions are lower in solid content than are the products normally obtained by reaction in absence of methanol and the like, they can be used to impregnate more effectively a larger weight of fillers than is usually employed when urea-formaldehyde reaction mixtures are used in making molding compositions. That is, the proportion of fillers (preferably of low acidity represented by pH 6 or above) such as wood-flour, asbestos, linters, ground pulp or mineral powders, and pigments, in the composition can be used in increased amounts, say 150 per cent of the weight of the dry condensation product, and still obtain thorough impregnation of the mass. This feature is also of advantage in the making of laminated products. The reaction mixtures of the present invention have a low viscosity and readily penetrate and impregnate sheets of paper, cloth, wood and the like, which sheets can then be dried and superposedly united under heat and pressure.

Each of the reaction mixtures identified above by number was also used in making hot-molding compositions. After standing for 48 hours each reaction mixture was mixed with 40 parts of cellulose flock and allowed to air-dry. When thoroughly dry each composition was put in a ball mill and finely ground. Then glycerol dichlorohydrin in amount equivalent to 1 cc. per each 100 g. of composition and zinc stearate equivalent to 0.2 per cent were incorporated. Finally each composition was pressed at 125° C. under a pressure of 3,500 lbs. per square inch.

Example 5 gave a molding of even texture. The flow was satisfactory but not quite as good as in Example 1, which condensation product was prepared in the presence of an amount of methanol equal to that of the formaldehyde solution.

Example 6 had slightly less flow than Example 5 but gave a molding of high translucency.

Example 7 (ethyl alcohol) had very pronounced flow and formed a strong, very translucent molding.

Example 8, in which acetone was used as the mitigating solvent, exhibited excellent flow and yielded a strong translucent molding of good fin.

Example 9 (isopropyl alcohol as the mitigating solvent) showed, after adequate drying, very good flow and satisfactory translucency.

Example 10, using monomethyl ether of ethylene glycol, showed excellent flow and yielded a very translucent molding.

Example 11, which made use of the condensation product prepared in the presence of a mixture of methanol and secondary butyl alcohol, did not flow as well and yielded a somewhat opaque molding of lower strength than Example 1.

Example 12, making use of a condensation product prepared in the presence of a mixture of acetone and amyl alcohol, showed good flow and excellent translucency after the high-boiling solvent had been eliminated.

The insoluble material obtained from commercial formaldehyde solution and urea in the absence of a mitigating solvent was also mixed with fillers and the finely ground mixture was subjected to molding in order to compare the result with those of the above examples. This composition exhibited practically no flow and yielded opaque moldings of low strength.

It should be noted that these compositions were made with resin which in the earlier stages of condensation carried a content of acid which ordinarily would be inimical to good molding performance. However, despite the acid content the flow was exceptionally good, yielding molded articles which exhibited a good fin and an excellent impression of the mold. In fact, acidulation by acid having a degree of ionization or degree of dissociation (dissociation constant) less than that of formic acid apparently is conducive to orientation of the reaction, at least in the earlier stages, in a manner favorable for the production of molded articles. The earlier stages of the reaction may include the initial reaction or some part of the reaction prior to the final heat treatment such as occurs in molding to produce insoluble and infusible products.

In this way there becomes available the process which comprises reacting urea and aqueous methanolic formaldehyde of normal acid reaction in the presence of an added quantity of methanol sufficient in amount substantially to repress spontaneous rise in temperature, the reaction mixture containing an added acid whose degree of ionization is less than that of formic acid and may include acids from a group exemplified by acetic, propionic, acetyl-salicylic, mucic and boric acid. Both inorganic and organic acids of the requisite characteristics, therefore, may be employed. For most cases, however, volatile organic acids are preferred to non-volatile ones in order to avoid leaving in the finished resin or composition substances which are foreign to the normal urea-formaldehyde condensation material.

According to the present invention commercial formaldehyde was mixed with 0.5 per cent of butyric, benzoic, tannic, lactic, mucic, propionic, acetylsalicylic and boric acids and to 80 parts of the acid-containing formaldehyde there were added 80 parts methanol and 40 parts urea. No apparent rise in temperature occurred. After standing for 24 hours the reaction mixtures containing butyric, tannic, mucic, propionic and boric acids were clear. The others showed slight precipitation but cleared when the solutions were warmed gently.

The effect of the added acid varies somewhat depending upon the proportions in which it is used. Acetic acid was added to commercial formaldehyde in increasing amounts and the acidified formaldehyde solution was mixed with urea and methanol in the proportions of 80 parts commercial formaldehyde, 80 parts methanol and 40 parts urea. With acetic acid in amounts of 0.1, 0.2 and 0.5 per cent based on the formaldehyde solution, no precipitate formed when the mixture has stood for 24 hours; after 48 hours a slight precipitate appeared but this dissolved when the mixture was warmed slightly. With 1 per cent of acetic acid a slight precipitate appeared after 24 hours and this was soluble when the temperature of the mixture was increased slightly. When 10 per cent of acetic acid was added to commercial formaldehyde and reacted as above, a voluminous precipitate formed during 24 hours. This precipitate was only partially soluble when the mixture was heated.

Using glacial acetic acid in amount equivalent to 50 per cent of the formaldehyde solution, that is an amount equal to that of the urea, the reaction mixture became cloudy in a short time. On standing for 24 hours most of the cloudiness disappeared and an almost clear solution was obtained. This solution could be concentrated by boiling off the solvents to give at first a colorless gel and finally a clear glass-like material. Acetic anhydride acts in a way similar to acetic acid. When methanol is omitted and the same amount of glacial acetic acid is used, the temperature of the reaction mixture rises considerably and a large amount of water-insoluble material rapidly forms. The use of organic solvent bodies in mitigating proportions therefore permits the advantageous addition of certain acids in substantial proportion whose degree of ionization is less than that of formic acid.

What I claim is:

1. The process of making condensation products initially soluble in water which comprises reacting urea and aqueous commercial formaldehyde of normal acid reaction in the molar proportions of 1:1.5 of urea to formaldehyde at temperatures below 35° C. in the presence of added methanol in an amount equal to from 25% to 100% of the aqueous commercial formaldehyde.

2. The process of making condensation products soluble in water which comprises reacting urea and aqueous commercial formaldehyde of normal acid reaction in the presence of an added substantial proportion of a miscible organic solvent mitigating body selected from the group consisting of monohydric alcohols, acetone, ethers of ethylene glycol, and glycol acetals in an amount equal to from 25% to 100% of the aqueous commercial formaldehyde.

3. A product comprising the condensation product resulting from the process of claim 2.

CARLETON ELLIS.